Feb. 11, 1936.  D. D. STONE  2,030,232

BEARING LUBRICATION

Filed Aug. 21, 1933

Inventor
Donald D. Stone
By Blackmore, Spencer & Flint
Attorneys

Patented Feb. 11, 1936

2,030,232

UNITED STATES PATENT OFFICE 2,030,232

BEARING LUBRICATION

Donald D. Stone, Flint, Mich., assignor to General Motors Corporation, Detroit, Mich., a corporation of Delaware Application August 21, 1933, Serial No. 686,046

2 Claims. (Cl. 308—168)

This invention has to do with lubricated thrust bearings such as are employed at one or more of the main bearings of automobile crankshafts. These bearings commonly take the form of flanges formed on the ends of the cylindrical half bearings which receive the shaft, and are customarily coated with babbitt or other soft metal to reduce friction and prevent scoring.

One characteristic of the service performed by such thrust bearings is the fact that under normal running conditions with the clutch engaged there is very little, if any, load on the thrust bearings, but when the clutch is released the releasing pressure exerts a forward thrust on the crankshaft which is received by the thrust bearing. It is the object of this invention to provide for better lubrication of the thrust bearing when thus under load. This has been accomplished very simply by providing the thrust bearing with grooves having closed ends and leading toward the outer edge of the bearing. The closed ends prevent rapid escape of oil when the bearing is not under load, and when the bearing is under load permit the building up of a high oil pressure which insures good lubrication. The bearing may be supplied with lubricant from the usual oil grooves of the cylindrical bearing.

While the invention has been designed for the specific use stated, it is obviously susceptible of employment on all plain thrust bearings whether combined with a cylindrical bearing or not, and regardless of the method of supplying oil to the grooves.

Figure 3:
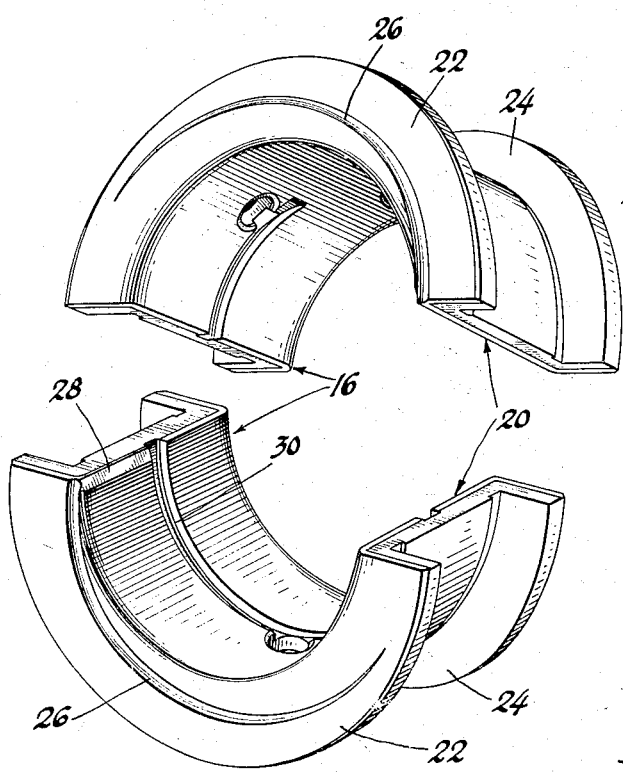
Figure 3 is a perspective view of the bearings.

10 indicates a portion of the crankcase of an automobile engine housing within it the crankshaft 12 carrying connecting rods 14. 16 indicates one of the main bearings for the crankshaft suitably supported in web 18 of the engine block. The bearing 16 is of the usual type made up of semi-cylindrical shells 20 provided with integral flanges 22 and 24 serving as thrust bearings. Since with conventional clutch construction the release of the clutch produces a forward thrust on the crankshaft and at other times there is substantially no thrust load, I have shown my lubricating arrangement applied to the center thrust bearing only. However, it may be employed with the forward thrust bearing or with both if this is required by conditions of service. The thrust bearing 22 is supplied with lubricant through spiral groove 26 which decreases in depth as the outer periphery of the bearing is approached, and as shown in Figure 3 stops short of the periphery. Groove 26 is supplied with lubricant through the passage provided at 28 by bevelling off the corner of the bearing at the parting line. Passage 28 is supplied with lubricant through groove 30 extending around the cylindrical portion of the bearing, and groove 30 is supplied with lubricant through pipe 32 connected to the oil pump.

Figure 1:
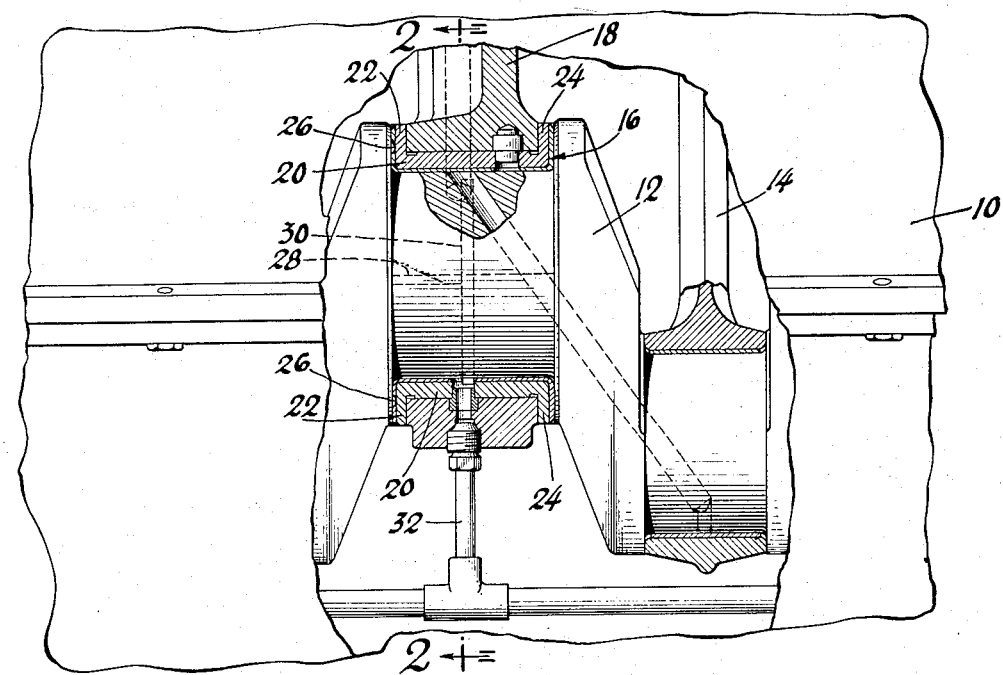
Figure 1 is a side view of a portion of an automobile engine showing part of the side of the crankcase broken away to reveal one of the main bearings provided with thrust bearing flanges made in accordance with this invention.
Figure 2:
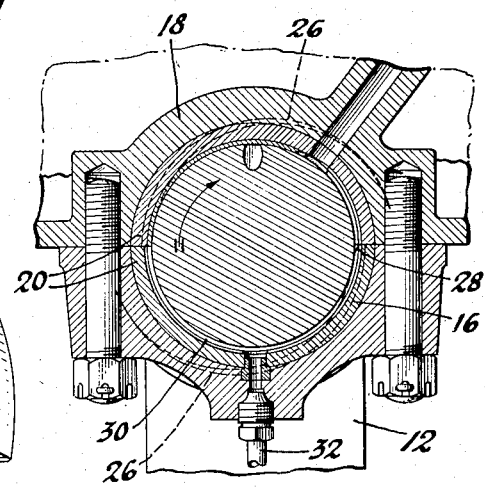
Figure 2 is a section on line 2—2 of Figure 1.

I have made careful test to determine the effectiveness of this method of lubrication of the thrust surfaces by connecting an oil pressure gage so as to measure the pressure in the outer end of the spiral grooves 26. Thus with the clutch engaged and no load on the thrust bearing, and with an oil line pressure of from 21 to 35 pounds, I found the oil pressure at the outer ends of the grooves 26 to range between 5 and 12 pounds. With the clutch disengaged and the thrust bearing under load, and with an oil line pressure of from 24 to 35 pounds the pressure at the end of the spiral grooves ranged between 74 and 93 pounds. This increase in pressure is the result of the rotation of the crankshaft. The shaft as shown in Figure 2 rotates in a direction to force oil to the outer ends of the spiral grooves, and so builds up this very substantial oil pressure in the grooves. The increased oil pressure was apparently sufficient to build up the desired oil film at the thrust surface, and as a consequence a number of engines tested with this construction showed little signs of wear on the thrust surfaces, while identical engines provided with conventional thrust surfaces showed substantial wear after relatively short service.

I claim:

1. A combined cylindrical and thrust bearing composed of two parts, each provided with a cylindrical bearing surface and a thrust bearing surface, one of said thrust bearing surfaces being provided with a dead-ended groove extending from the cylindrical bearing surface toward the outer periphery of the thrust bearing surface, said groove tapering in depth and being of greatest depth at its inner end, a port for supplying lubricant under pressure to the cylindrical bearing surface, a passage connecting said port with the groove in the thrust bearing, said passage following the parting line between the portions of the bearing.

2. A split combined journal bearing and thrust bearing having a spiral oil distributing groove in its thrust surface, an oil groove in the journal bearing, a port in the bearing in communication with the groove for supplying oil thereto, the parting line of the bearing being beveled to provide a passage connecting said grooves.

DONALD D. STONE.